United States Patent [19]

Ehrrich

[11] 4,280,658

[45] Jul. 28, 1981

[54] LIQUID FILTER AND MASS TRANSFER MEANS

[75] Inventor: John E. Ehrrich, Wayland, Mass.

[73] Assignee: Ercon Corporation, Waltham, Mass.

[21] Appl. No.: 942,376

[22] Filed: Sep. 14, 1978

Related U.S. Application Data

[63] Continuation-in-part of Ser. No. 738,631, Nov. 3, 1976.

[51] Int. Cl.³ .................. B01D 13/00; B01D 39/00
[52] U.S. Cl. .................................. 239/6; 210/650;
    210/500.2; 222/187
[58] Field of Search ................ 239/6, 34, 44, 45, 46,
    239/50, 51, 145; 47/79–81, 86, 48.5; 210/510,
    500 R, 500 M, 23 F; 261/99, 104, 107; 222/187

[56] References Cited

U.S. PATENT DOCUMENTS

| 2,944,017 | 7/1960 | Cohon | 210/500 M |
| 3,298,133 | 1/1967 | Courtright | 47/81 X |
| 3,520,416 | 7/1970 | Keedwell | 261/104 X |

FOREIGN PATENT DOCUMENTS 1493029 7/1967 France ........................................ 47/81

OTHER PUBLICATIONS

Millipore Filters Catalog MF-1957 Supplement, © 1957 by Millipore Filter Corp., Watertown, Mass.

Primary Examiner—Andres Kashnikow
Attorney, Agent, or Firm—Robert A. Cesari; John F. McKenna; Andrew F. Kehoe

[57] ABSTRACT

An inexpensive, liquid-supplying and liquid-cleaning apparatus capable of functioning through capillary action. Such apparatus finds use in humidification systems, or life-support systems of varying types. It is characterized by the use of a microporous membrane having pores of a nominal size of less than 10 microns which act as capillaries in the liquid supply means, and also as means to exclude algae, fungi, etc. from the liquid being supplied. The more advantageous embodiments of the apparatus comprise a novel vacuum/pressure seal to help avoid leakage of water conducted from a flexible hose into a rigid container.

9 Claims, 6 Drawing Figures

LIQUID FILTER AND MASS TRANSFER MEANS

RELATED APPLICATION

This application is a continuation-in-part of U.S. Patent Application Ser. No. 738,631 filed Nov. 3, 1976 by John E. Ehrreich.

BACKGROUND OF THE INVENTION

This invention relates to various apparatus and processes found advantageous in the sustained supply of water as may be required in a humidification system, a life-support system, or the like. One aspect of the invention is a novel means for forming a pressure/vacuum seal between a flexible tubing and a rigid container.

Another type of apparatus disclosed in the art is that relating to the sustained feeding of moisture to sustain life. Among such devices are those disclosed in U.S. Pat. Nos. 3,753,315; 3,758,987; 2,183,970; 3,958,366; and the like.

Most of the liquid-supply devices are excessively cumbersome and expensive to produce, have relatively short sustained-watering duration, or are susceptible to having their water-feed sustaining means wholly or partially plugged. Indeed, most prior art devices present a combination of such problems to the user.

Capillary flow-inducing water-feed devices (which will be described below in connection with the most favorable water-feeding devices of the invention) have been known to the art. However, they have been deficient in operating characteristics for various reasons. For example, wick-type water feeders have such enormous areas exposed to the air that they lose too much water by evaporation before it is transported to the intended destination. One attempt to avoid this problem was to use a porcelain-type filter. However, since the filter had to be constructed in such a way as to avoid large, vacuum-breaking pores, it was constructed to have very small pores. Moreover, the length of the pores was relatively long because the pocelain required substantial thickness for mechanized strength. The consequence of the prior art construction utilizing such a ceramic material was that its total flow capacity was far too low to suggest the potential advantage of membrane-feed devices described herein.

It is another object of the invention to provide a novel polymeric or fiber-type microporous-membrane water-feeding apparatus, one which has an excellent combination of controlled pore size and thinness, to provide high water-feed rates and yet maintain a water-feed system free of air locking.

Still another object of the invention is to provide apparatus and process for growing mold, algae, fungi and the like.

Other objects of the invention will be obvious to those skilled in the art on their reading of this disclosure.

The above objects have been achieved by providing apparatus having a number of novel and advantageous features. In the first instance, the water-supply apparatus comprises a novel thin polymeric, microporous, membrane-feeding apparatus.

The apparatus of the invention more conveniently features a water supply device which is characterized by an ability to act as a thin capillary membrane to provide water to a designated situs and to draw water from a reservoir up through a tube. In filling such an apparatus, siphoning can be used. It has been found that a seal useful under pressure and vacuum can be readily formed to provide such a dual purpose seal between a rigid wall and a flexible tubing.

The thin porous membrane for use in the apparatus can be selected over a wide range of materials with particular attention given to the duration of time during which sustained, undisturbed growth of seedlings is required. However, in most embodiments of sustained watering apparatus disclosed herein, it will be of particular importance to restrict the thin porous polymeric or fiber-type membrane to one having a pore size characterized by a bubble point in excess of 4 inches of water, gauge, as is known in the porous-membrane art. In such situations, it is helpful to have a porosity bubble point of at least 4 inches of water; but more advantageously of from 12 inches to about 2 feet of water or more.

One favorable water-distributing polymeric membranes are those sold under the trade designation Microweb AW1ᵃ by Millipore Corporation of Bedford, Massachusetts. This membrane has a nominal 3-micron size. In general, pore sizes of from 0.05 micron to 10 microns are useful. Not only cast thin polymeric membranes, but also fabricated thin filament membranes are useful. Moreover, the material of construction is not important as long as the wetting characteristics and pore size allow a suitable capillary-flow rate and suitable bubble point. In general, the most advantageous membranes are less than 0.030 inch thick. Thus, useful thin membranes can be prepared from cellulose nitrate and acetate, polyvinylidene fluoride, polycarbonate, polyvinyl chloride and non-woven fiber (including inorganic fibers) with and without wetting agents.

Among the advantages of such membranes, in addition to their ability to provide water at high rates when needed, is the fact that, at pore sizes of below 3 microns, and especially below 0.2 micron, there is a significant exclusion of water-borne biological contamination such as small plants, bacterial and the like. This is believed to be of value as plant culture in general but it is of particular value in growing of sensitive plant life and especially of value in such harvest-oriented processes as fungi grown in preparative chemical processes, e.g. in preparation of pharmaceuticals and the like. In general, pore sizes below 10 microns are more useful than those having pore sizes between 10–20 microns.

The apparatus comprising a capillary-flow inducing filter of the present invention is particularly versatile because of such characteristics of the filter as: flexibility at all temperatures above the freezing point of water; better liquid transport capacity; freedom from any particulate residuals which are used in making some filters known to the art; greater reproducability during manufacture; less susceptibility; and greater ease in sterilizing.

Although cast polymeric membranes are preferred for most applications, it is also possible to use fibrous filters having appropriate characteristics. Such filters are manufactured by Pall Corporation, among others.

In the more favorable embodiments of the invention, the capillary filter of the invention is utilized in conjunction with a water-wicking distributor means which has a greater surface area than the membrane filter and assures distribution of liquid over a larger surface area than would be provided by the filter surface alone. Any wicking means suitable for a particular application may be selected; e.g. a highly wicking-absorbent paper would be useful. Indeed, flexible distributors are desirable to assure best contact with the membrane filter which itself is, advantageously, flexible to allow maximum choice in filter design configurations.

ILLUSTRATIVE EMBODIMENTS OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

Figure 2:
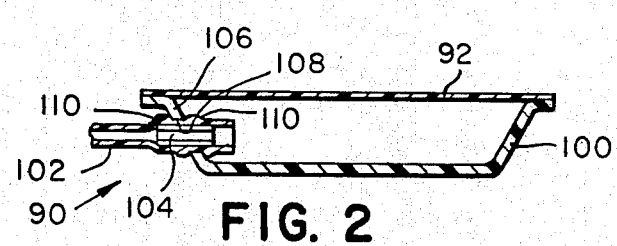
FIG. 2 is a section of a water-feeding device of the invention showing particularly an important sealing construction.
Figure 6:
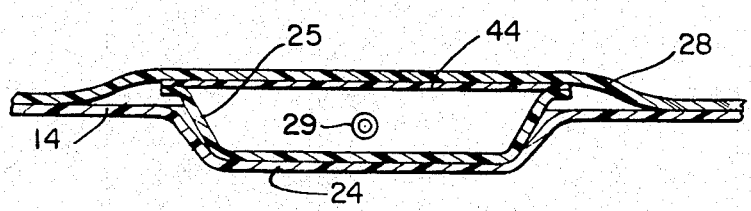

FIG. 6 supplements FIG. 2, schematically, showing more detail on the membrane pan-bearing water-feeding device.

Figure 1:
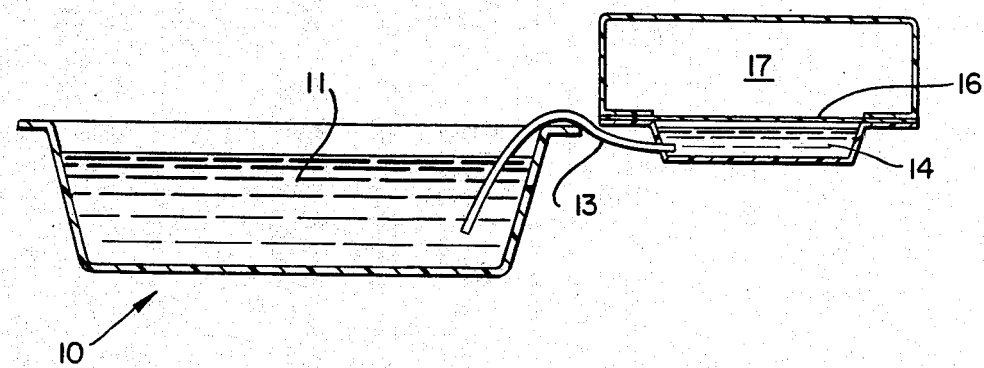
FIG. 1 is a schematic view of a watering apparatus according to the invention with said germinator in use and after the first seedlings appear.

Referring to FIG. 1, it is seen that the liquid-supplying process of the invention is demonstrated by use of a reservoir 10 of water 11 which water is carried through a section of tubing 13 into a shallow water-holding pan 14. Pan 14 comprises, as a cover or top thereover, a microporous ultrafilter membrane 16 which has a nominal pore size of about 3 microns. Above membrane 16 is a chamber 17 which is adapted to receive liquid through the membrane. It is to be emphasized that such water transmission is in the liquid, as opposed to gas, state.

The transfer is possible because of the capillary action of the membrane. In the preferred embodiments of the invention, the tubing 13 is selected to have an inside diameter which is sufficiently small, e.g. about 0.1 inch or smaller, so that it can act most conveniently as a syphon to fill the pan. In starting a syphoning action, a flexible tube, almost filled with water, can be removed from the reservoir from which it is to supply water. It is then attached to the filter-pan assembly and the pan is brought below the level of the reservoir. Thus, syphoning is started to fill the pan. It is advantageous to have a tube that facilitates starting the syphon action without the need to use supplementary steps such a pinching off of the end of the tube. A plastic tube of about a 0.1 inch inside diameter is advantageously used. With such a tube the friction between water and the tube wall will not allow the water to flow backward towards the reservoir until the syphoning action, which supplied water to the pan, starts. Once the syphon action starts it can be used to fill the pan 14. The microporous membranes of the invention, while still dry, do not oppose the flow of air sufficiently to shut off the syphoning action. Moreover, once the pan 14 and the membrane filter are filled, the pores act as capillaries which exert a positive pull on the water and allow the membrane to be raised above the water level of the reservoir 10.

FIG. 2 is a section of a water-feeder means 90 which comprises a membrane member 92 and a container 100. The membrane is preferably a water-dispensing, i.e. water-feeding, member having a pore size characterized by a bubble point about 4 inches of water, gauge, and a nominal pore size of from about 0.05 to 10 microns.

It has been a particular problem to provide a strong, inexpensive, and efficint water-tight seal between a flexible tubing, e.g. a flexible, soft polymer tubing, and a rigid material such as metal or a rigid plastic-like polystyrene. A suitable seal must resist leakage under vacuum or pressure. Of course, this leak resistance must be viewed in the context of the disclosed apparatus, i.e. leak resistance up to about 10 feet of water pressure, guage, whether the pressure is positive or negative. In fact, the seal performs far better than this requirement.

Referring to FIG. 2, it is seen that such a seal is formed between a rigid polystyrene container 100 and a flexible polyvinyl chloride tubing 102. Container 100 is a petri dish-shaped container having a wall thickness of about 0.090 inch. The flexible tube has an outside diameter of about ⅛ inch, an inside diameter of about 1/16 inch, and a wall thickness of about 0.029 inch. A rigid steel cylinder 104 of about 0.090 mil outside diameter is used in achieving this seal. Metal or a rigid structured plastic or the like can be used. However, metal cylinders (or more exotic materials like carbon-fiber reinforced polyester) allow the best strength to be achieved while minimizing wall thickness of the rigid cylinder and, consequently, any interference with flow.

In forming the seal of FIG. 2, a generous length of tubing 102 is placed through the hole, whereupon sleeve 104 is slipped one-half way into the end of the tube on the inner side of container 100. The tube is then pulled outwardy from container 100 until the presence of cylinder 104 causes the tube to resist being pulled through rigid wall 106 of the plastic container. Thereupon the steel cylinder 104 is pushed firmly into the tubing, causing the plastic material from which the tubing is formed to compress to a thinner wall 108 between steel cylinder 104 and wall 106, and to have somewhat thickened portion 110 of the elastomer on each side of the wall 106.

The resultant seal effectively avoids leakage under positive pressure and vacuum conditions.

Figure 3:
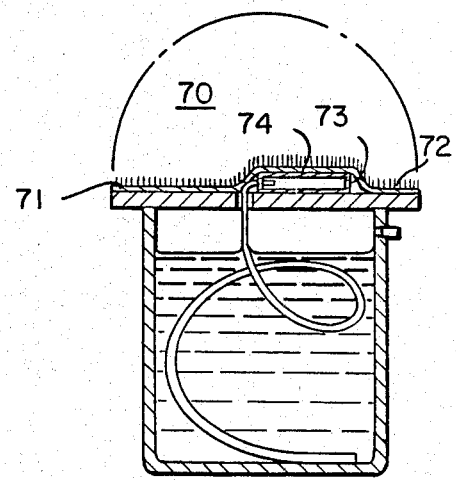
FIG. 3 illustrates, schematically, use of the invention for growing mold and other such simple plants.

In general, it is advantageous, where
 X = wall thickness of the polymer tubing;
 A = outside diameter of the polymer tubing;
 C = outside diameter of the rigid sleeve; and
 B = diameter of the aperture through which the tubing is to be iserted that A is from 70 to 105 percent of B; and, moreover, that C, less the inside diameter of the polymer tubing, is from 10 to 90 percent of 2X. The length of the rigid sleeve is greater than the wall thickness of the container, and protrudes from each end of the aperture in the container FIG. 3 illustrates a further embodiment of the invention wherein simple plants, particularly fungus of various types, are grown within a suitably sterile environment 70. The water-distributor 71 is preferably formed of a wettable and sterilizable fibrous, woven or nonwoven mat. The water-permeable surface of the water feeder 73 has a relatively high bubble point (i.e. a small pore size) and has the capability of excluding submicron bacterial growth from the distributor 72.

Figure 4:
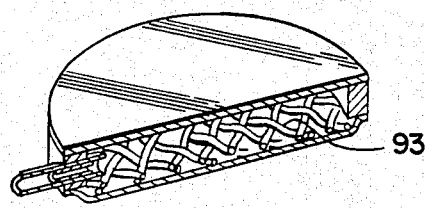
FIGS. 4 and 5 illustrate two additional microporous water-feeding devices, each having two water-permeable surfaces.
Figure 5:
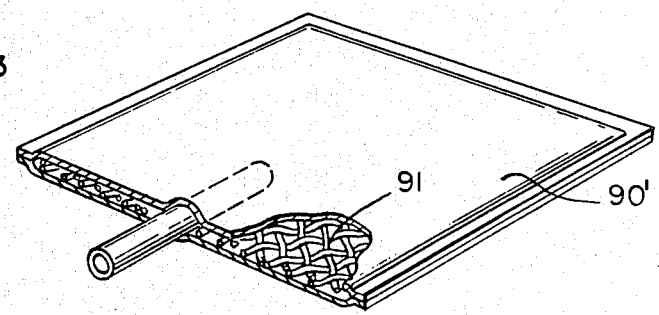

FIGS. 4 and 5 illustrate water feeders 90 and 93 respectively. Feeder 90 comprises two membranes, epoxy-bonded along the periphery thereof and reinforced with a screen 91, which keep the membrane material from collapsing when negative pressure exists within the envelope. In other respects, the feeder functions like those described below.

Feeder 90' is similar to that described in FIG. 2 excepting it bears a water-feeding membrane on both faces.

FIG. 6 shows an alternate construction wherein a pan 24 covered with a membrane 25 is placed within a wicking member (e.g. cloth member) 28 and fed via a tube as indicated at 29.

It is also to be understood that the following claims are intended to cover all of the generic and specific features of the invention herein described and all statements of the scope of the invention which might be said to fall therebetween.

What is claimed is:

1. A process for supplying filtered liquid to a situs requiring said liquid, said process comprising the steps of simultaneously filtering said liquid through capillary action provided by a thin membrane having nominal pore sizes between 0.05 and 10 microns and wherein said capillary actions draws water through a tube from a reservoir situated beneath said situs requiring liquid, and wherein said process comprises the additional step of transferring said liquid from said membrane to a wick-type distributor of substantially greater surface area than the membrane surface area, and thence to said situs.

2. A process as defined in claim 1 wherein said membrane has a maximum overall thickness of 30 mils.

3. A process as defined in any of claim 2 wherein said liquid is an aqueous liquid and wherein said membrane has an overall thickness of from 2 to 10 mils.

4. A process as defined in claim 1 wherein the bubble point of said membrane is less than two feet of water.

5. Apparatus for supplying filtered aqueous liquid to a chamber requiring said filtered aqeuous liquid, said apparatus comprising a thin polymeric ultrafilter-type membrane forming means to filter said liquid and also forming means to assist pulling said liquid, by capillaries contained within said membrane, into said chamber and, additionally, comprising a wicking means of substantially greater surface area than the membrane surface area, said wicking means placed between said membrane and the environment of said chamber, said wicking means forming means to distribute liquid to said environment.

6. Apparatus as defined in claim 5 wherein said membrane has a pore size of at least 0.05 micron.

7. Apparatus as defined in claim 6 wherein said membrane has a maximum nominal pore size of 10 microns.

8. Apparatus as defined in claim 5, 6, or 7 wherein said apparatus comprises a reservoir and said membrane is positioned above said reservoir.

9. An apparatus as defined in claim 5 wherein the bubble point of said membrane is at least 12 inches of water.

* * * * *

UNITED STATES PATENT AND TRADEMARK OFFICE
CERTIFICATE OF CORRECTION

PATENT NO. : 4,280,658

DATED : July 28, 1981

INVENTOR(S) : John E. Ehrreich

It is certified that error appears in the above-identified patent and that said Letters Patent are hereby corrected as shown below:

Column 1, Inventor's Name - change "Ehrrich" to --Ehrreich--;

Column 5, line 13 - change "25" to --44--;

Column 5, line 13 - change "24" to --25--.

Signed and Sealed this

Sixteenth Day of February 1982

[SEAL]

Attest:

Attesting Officer

GERALD J. MOSSINGHOFF

Commissioner of Patents and Trademarks